United States Patent Office 3,072,425
Patented Jan. 8, 1963

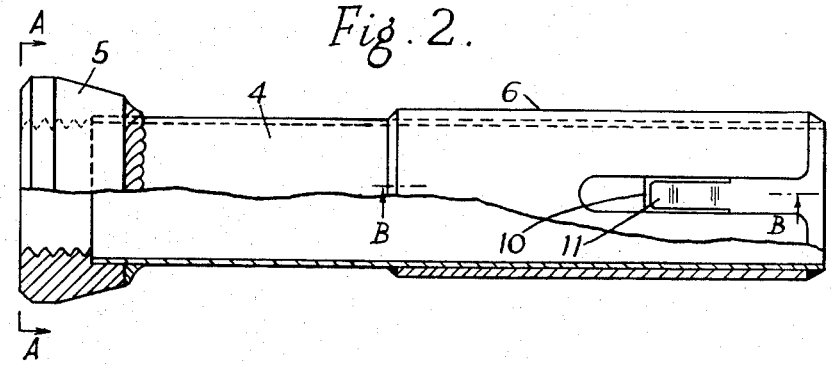
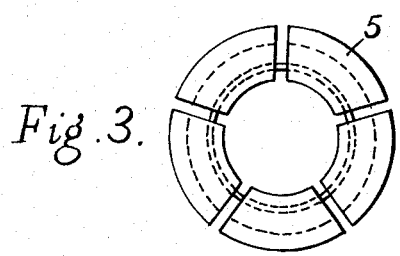
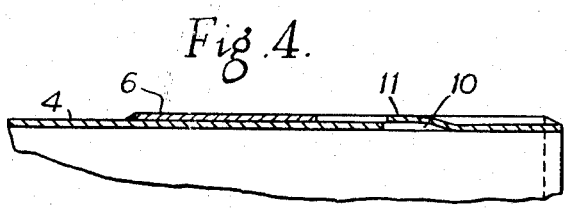

3,072,425
ADJUSTABLE OR TELESCOPIC LEGS
John William Nicholls, Hillingdon, England, assignor of one-half to Martin Thomas Limited, Southall, England, a British company
Filed Feb. 10, 1961, Ser. No. 88,337
Claims priority, application Great Britain Mar. 15, 1960
8 Claims. (Cl. 287—58)

This invention relates to adjustable or telescopic legs for various articles such as builders' staging units and hospital beds.

Folding staging units are known in the form of rectangular frameworks having four legs, and these units can be stacked one upon another with the lower ends of the legs of the upper unit engaging in the upper ends of the legs of the unit below.

Adjustable legs are known for such units having inner and outer members in which a small spring detent can be repressed to permit opening of a split collet that is formed on the outer member and has internal threads for engaging a thread on the inner member. These have the disadvantage that safety depends on this small detent and if this breaks a serious accident may ensue. Moreover, it is possible to unlock the collet even if the staging is loaded whereupon the leg may collapse. Furthermore, the split threaded collet is somewhat expensive and consequently is only supplied on special units, e.g. a user may buy ten units only one of which will have adjustable legs. As a result damage to the one unit may render all units out of use temporarily and even when not damaged the user can build only one stack of staging unless he buys another adjustable leg unit.

According to the present invention a leg comprises inner and outer members and a separate sleeve between said members having a split collet formed thereon for engaging the inner member, clamping means on the outer member for clamping the collet in locking position, and locking means for normally holding the sleeve in locked position axially of said members, said locking means being releasable to permit axial movement of the sleeve and inner member in relation to said outer member thereby releasing the collet from the inner member whereupon the latter can be extended to required length before re-engaging the collet.

A constructional form of the invention will now be described, by way of example, with reference to the accompanying drawings, in which:

FIGURE 2 shows an elevation of the sleeve of FIGURE 1;

FIGURE 3 shows an end view of FIGURE 2 in the direction indicated by line A—A on FIGURE 2; and FIGURE 4 shows a part section of FIGURE 2 in the direction indicated by the line B—B on FIGURE 2.

Figure 1:
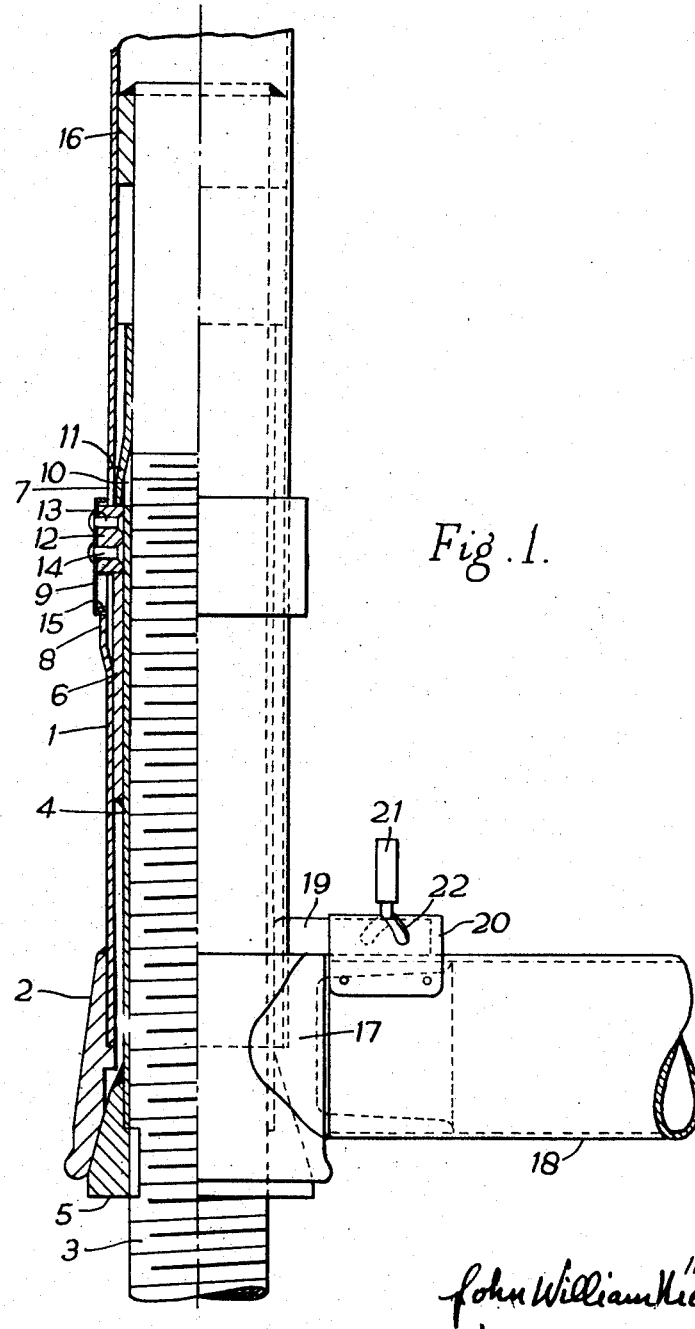
FIGURE 1 shows a partial sectional view of an adjustable leg of a staging unit constructed in accordance with the invention.

As shown in the drawings an outer tubular member 1 is provided at its lower end with clamping means in the form of a ring 2, having an internal frusto-conical surface at its lower end, said surface having its larger diameter lowermost. An inner member 3 is arranged within the outer member 1, and is screw threaded or fomed with rings or other ratchet means. A short separate sleeve 4 is slidably disposed within the outer member 1 and around the inner member 3 and carries a split collet ring 5 at its lower end, this ring 5 being formed internally with a thread, rings or other detent means to engage the ratchet means on the inner member 3. The collet ring 5 and the lower part of the sleeve 4 are split (as shown in FIGURE 3) so that the ring 5 when not clamped can spring away from the inner member 3 to an extent sufficient nearly to clear the thread on the inner member allowing the latter to be pulled out, in spite of the remaining overlap, with a small chattering effect.

The collet ring 5 has a frusto-conical exterior surface engageable by the clamping ring 2, so that load on the staging is applied by the clamping ring 2 to the collet ring 5 to clamp this onto the thread on the inner member 3.

A further sleeve 6 is welded to the sleeve 4 and extends over about half the length of the sleeve 4. This sleeve 6 is of sufficient diameter just to slide inside the outer member 1.

At some distance above the clamping ring 2 the outer member 1 is formed with a vertical slot 7, the lower end of which is formed as a spring abutment detent finger 8 bent outwardly. Surrounding the outer member above the detent finger 8 is a collar 9 which serves as a locking means for preventing axial displacement of the sleeve 4 in relation to the members 1 and 3. For this purpose the collar 9 engages between the finger 8 on the member 1 and a second abutment detent finger 11 on the sleeve 4. The short sleeve 4 and the sleeve 6 extend up beyond the slot 7 and are grooved by a vertical groove 10. The sleeve 4 is pressed out from the groove 10 to form the second detent finger 11 which can be reached through the slot 7 in the outer member 1 in a manner to be described hereafter.

The collar 9 carries an inwardly projecting stop block 12 which is secured to the collar 9 by two rivets 13, 14.

The collar 9 and the block 12 are located with a small amount of play between the first and second detent fingers 8 and 11, the second detent finger 11 locating against the upper surface of the bolck 12 and the first detent finger 8 locating against a lip 15 formed on the collar 9.

To adjust the leg, the first detent finger 8 is pressed in and the inner member 3 and sleeve 4 are pulled down until the first detent finger 8 is engaged by the lower surface of the block 12. This movement is sufficient to disengage the frusto-conical surface of the collet 5 from that of the clamping ring 2. After adjustment the user releases his contact with the unit altogether and the mere load on the unit causes the clamping ring 2 again to clamp the collet 5 onto the inner member 3.

To remove the inner member 3 and sleeve 4 completely the second detent finger 11 is repressed so that it clears the block 12 and the inner member 3 and the sleeve 4 are then moved downwards.

The detent finger 11 is made accessible through the slot 7 in the outer member 1 by first repressing the detent finger 8 and lowering the member 3 and the sleeve 4 until the detent finger 8 is engaged by the lower surface of the block 12. This action moves the collar 9 downwards relative to the outer member 1 and uncovers more of the slot 7 above the collar 9. The detent finger 11 can then be repressed by the operator's finger.

In the locked position only a small portion of the second detent finger 11 is accessible through the slot 7 and although this may be repressed by using a pencil or similar rod the operator is unable to use the finger of a hand.

The block 12 and the second detent finger 11 prevent inadvertent downward movement of the inner member and sleeve relative to the outer member, but do not carry the load on the staging.

The sleeve 6 is not extended to the lower end of the sleeve 4 so that the reduced thickness at this portion increases the springing of the collet parts.

The inner member 3 carries a collar 16 above the sleeve to bear slidably on the inner surface of the outer member 1.

The load carried by the staging is taken on the outer member and is applied to the collet and not to the locking arrangement of the two detent fingers and the block 12.

The collet cannot be unlocked except by first lifting the load.

By making the split collet on a separate short sleeve it becomes economic to form all staging units with clamping means and locking means so that cheap collets can be fitted to any units when required and can be easily and cheaply replaced if damaged.

The clamping ring 2 carries a socket 17 for attachment thereto of a crossbar 18 forming part of the staging. The crossbar 18 carries a pin 19 for engaging holes in the inner and outer members to locate these members when the collet 5 is removed and the leg is used as a non-adjustable stage.

The pin 19 is slidably mounted in a housing 20 attached to the crossbar 18, and the pin 19 may be engaged or withdrawn by means of a knob 21 attached thereto, which knob moves in an arcuate or helical slot 22 of the housing 20. The pin 19 is moved manually into the engaged position and will remain there until disengaged.

I claim:

1. An adjustable leg comprising a leg member formed on its exterior surface with ratchet means disposed along its length, a tubular member surrounding the leg member, a sleeve located around the leg member and within the tubular member, a split collet on the sleeve member radially deformable so as to be engageable with the ratchet means, a clamping means on the tubular member, said collet having an exterior surface engageable by an interior surface on the clamping means, at least one of said surfaces being inclined downwards so that downward load on the clamping means urges the collet to grip the ratchet means, a first detent means for holding the sleeve in an upper position in relation to the tubular member in which position the collet is locked on the ratchet means, said detent means being releasable to permit release of the collet from the clamping means, and a second detent means for holding the sleeve member against withdrawal from the tubular member but releasable to permit such withdrawal.

2. An adjustable leg as claimed in claim 1, wherein the clamping means is formed with an internal frusto-conical surface at one end thereof to provide the clamping means and the inclined surface on the collet is a frusto-conical exterior surface to be engaged by the similar surface on said clamping means.

3. An adjustable leg as claimed in claim 1, wherein the ratchet means is a screw thread and the collet is formed with an internal screw thread to engage the leg member.

4. An adjustable leg as claimed in claim 1 having a locking collar surrounding the tubular member and located axially in one direction by said first detent means which is carried by the tubular member, and in the other direction by said detent means which is carried by the sleeve member, the collar being releasable from the first detent means for unlocking the collet.

5. An adjustable leg as claimed in claim 4, wherein the second detent means is a spring finger on the sleeve member and is accessible through a slot formed in the tubular member when the collar and the sleeve member are in unlocked positions, said slot being covered by the collar to a greater extent in the locked position than in the unlocked position of the collar.

6. An adjustable leg as claimed in claim 1 wherein the first detent means is a spring finger on the tubular member.

7. An adjustable leg as claimed in claim 1, wherein the first abutment spring finger when repressed permits axial movement of the collar limited by engagement of a projection on the collar with said spring finger.

8. An adjustable leg as claimed in claim 1, wherein the second detent means is a spring finger carried by the sleeve member.

References Cited in the file of this patent

UNITED STATES PATENTS

| | | |
|---|---|---|
| 445,440 | Davis et al. | Jan. 27, 1891 |
| 2,062,628 | Yannetta | Dec. 1, 1936 |
| 2,912,202 | Petrick | Nov. 10, 1959 |
| 2,915,327 | Kreske | Dec. 1, 1959 |